United States Patent
Yura et al.

(10) Patent No.: US 11,211,600 B2
(45) Date of Patent: Dec. 28, 2021

(54) LITHIUM TITANATE SINTERED PLATE

(71) Applicant: NGK INSULATORS, LTD., Nagoya (JP)

(72) Inventors: Yukinobu Yura, Nagoya (JP); Shigeki Okada, Nagoya (JP); Nobuyuki Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 229 days.

(21) Appl. No.: 16/677,909

(22) Filed: Nov. 8, 2019

(65) Prior Publication Data

US 2020/0075933 A1 Mar. 5, 2020

Related U.S. Application Data

(63) Continuation of application No. PCT/JP2018/017930, filed on May 9, 2018.

(30) Foreign Application Priority Data

May 15, 2017 (JP) .............................. JP2017-096263
Dec. 20, 2017 (JP) .............................. JP2017-244186

(51) Int. Cl.
| | | |
|---|---|---|
| *H01M 4/131* | (2010.01) | |
| *H01M 4/485* | (2010.01) | |
| *H01M 10/0525* | (2010.01) | |
| *H01M 10/0566* | (2010.01) | |
| *H01M 4/02* | (2006.01) | |

(52) U.S. Cl.
CPC .......... *H01M 4/131* (2013.01); *H01M 4/485* (2013.01); *H01M 10/0525* (2013.01); *H01M 10/0566* (2013.01); *H01M 2004/027* (2013.01)

(58) Field of Classification Search
CPC ............. C04B 35/462; C04B 38/0074; C04B 38/0054; C04B 38/0058; C04B 2111/00853; C04B 2235/3203; C04B 2235/3275; C04B 2235/3277; C04B 2235/441; C04B 2235/5436; C04B 2235/5445; C04B 2235/5454; C04B 2235/5463; C04B 2235/6025; C04B 2235/612; C04B 2235/6562; C04B 2235/6567; C04B 2235/785; C04B 2235/786; C04B 35/01; C04B 35/638; C04B 35/64; H01M 10/0525; H01M 10/0566; H01M 2004/027; H01M 4/131; H01M 4/485

See application file for complete search history.

(56) References Cited

U.S. PATENT DOCUMENTS 9,209,451 B2    12/2015    Fukushima
2018/0219224 A1 *  8/2018    Esaki .................. H01M 4/0471

FOREIGN PATENT DOCUMENTS

| JP | 2002-042785 A1 | 2/2002 |
|---|---|---|
| JP | 2013-012338 A1 | 1/2013 |
| JP | 5174283 B2 | 4/2013 |
| JP | 2015-185337 A1 | 10/2015 |
| WO | 2012/086557 A1 | 6/2012 |

OTHER PUBLICATIONS

International Search Report and Written Opinion (Application No. PCT/JP2018/017930) dated Jun. 26, 2018 (with English translation).

* cited by examiner

*Primary Examiner* — Carlos Barcena
(74) *Attorney, Agent, or Firm* — Burr & Brown, PLLC

(57) ABSTRACT

Provided is a lithium titanate sintered plate for use in a negative electrode of a lithium secondary battery. The lithium titanate sintered plate has a structure in which a plurality of primary grains are bonded, and has: a thickness of 10 to 290 μm; a primary grain diameter of 0.70 μm or less, the primary grain diameter being a mean grain diameter of the primary grains; a porosity of 21 to 45%; an open pore rate of 60% or more; a mean pore aspect ratio of 1.15 or more; a ratio of 30% or more of pores having an aspect ratio of 1.30 or more to all the pores; and a mean pore diameter of 0.70 μm or less, wherein volume-based D10 and D90 pore diameters satisfy the relationship: 4.0≤D90/D10≤50.

5 Claims, No Drawings

LITHIUM TITANATE SINTERED PLATE

CROSS-REFERENCE TO RELATED APPLICATIONS

This application is a continuation application of PCT/JP2018/017930 filed May 9, 2018, which claims priority to Japanese Patent Application No. 2017-096263 filed May 15, 2017 and Japanese Patent Application No. 2017-244186 filed Dec. 20, 2017, the entire contents all of which are incorporated herein by reference.

BACKGROUND OF THE INVENTION

1. Field of the Invention

The present invention relates to a lithium titanate sintered plate for use in negative electrodes of lithium secondary batteries.

2. Description of the Related Art

Lithium titanate, $Li_4Ti_5O_{12}$ (hereinafter, referred to as LTO), has recently attracted attention as negative electrode materials used in lithium secondary batteries (also referred to as lithium ion secondary batteries). The LTO used in negative electrode materials of lithium secondary batteries has some advantages, such as a small volume change accompanied by intercalation and deintercalation of lithium ions, a long cycle life and high safety compared to carbonaceous negative electrodes, and superior low-temperature operation characteristics.

In order to further improve battery performance, such as energy density, sintering of the LTO has been proposed. In other words, the use of sintered LTO has been proposed for positive electrodes or negative electrodes of lithium secondary batteries. For example, PTL 1 (JP5174283B) discloses sintered LTO containing crystalline particles of titanium oxide, the sintered LTO having a mean pore diameter of 0.10 to 0.20 μm, a specific surface area of 1.0 to 3.0 m²/g, and a relative density rate of 80 to 90%. PTL 2 (JP2002-42785A) discloses sintered LTO that has a filling rate of active material of 50 to 80% and a thickness of more than 20 μm to 200 μm. PTL 3 (JP2015-185337A) discloses sintered LTO that has a relative density rate of 90% or more and a grain diameter of 50 nm or more.

CITATION LIST

Patent Literature

PTL1: JP5174283B
PTL2: JP2002-42785A
PTL3: JP2015-185337A

SUMMARY OF THE INVENTION

In general, lithium titanate (LTO) has remarkably low electron conductivity and lower ion conductivity compared to lithium cobaltate, which is widely used. In order to overcome these disadvantages, LTO powder having a small particle diameter is used in electrodes composed of LTO mixtures with conventional binders and conductive aids. However, a negative electrode having such a configuration cannot still have properties satisfying the requirements, such as high energy density, rapid charge/discharge, and superior high-temperature operation characteristics in IoT applications. In this regard, sintered LTO as disclosed in PTLs 1 to 3 has high electron conductivity and superior high-temperature operation characteristics due to an improvement in compactness by sintering, but exhibits low lithium ion conductivity due to lack of pores that permit penetration of an electrolytic solution, resulting in insufficient high-rate performance.

The present inventors have now found that an LTO sintered plate having a predetermined grain diameter and satisfying predetermined parameters on pores can have high lithium ion conductivity and high electron conductivity and result in satisfactory high-rate charge/discharge performance and superior high-temperature operation characteristics when incorporated as a negative electrode into a lithium secondary battery.

Accordingly, an object of the present invention is to provide an LTO sintered plate having high lithium ion conductivity and high electron conductivity and resulting in satisfactory high-rate charge/discharge performance and superior high-temperature/low-temperature operation characteristics when incorporated as a negative electrode into a lithium secondary battery.

One embodiment of the present invention provides a lithium titanate (LTO) sintered plate for use in a negative electrode of a lithium secondary battery. The LTO sintered plate has a structure in which a plurality of primary grains are bonded, and has:
  a thickness of 10 to 290 μm;
  a primary grain diameter of 1.2 μm or less, the primary grain diameter being a mean grain diameter of the primary grains;
  a porosity of 21 to 45%;
  an open pore rate of 60% or more;
  a mean pore aspect ratio of 1.15 or more;
  a rate of 30% or more of pores having an aspect ratio of 1.30 or more to all the pores; and
  a mean pore diameter of 0.70 μm or less, wherein volume-based D10 and D90 pore diameters satisfy the relationship: $4.0 \leq D90/D10 \leq 50$.

One embodiment of the present invention provides a lithium secondary battery comprising a positive electrode, a negative electrode containing the LTO sintered plate, and an electrolytic solution.

DETAILED DESCRIPTION OF THE INVENTION

Definition

The definitions of the parameters are given below for specifying the present invention.

In the present specification, the term "primary grain diameter" refers to a mean grain diameter of a plurality of primary grains constituting the LTO sintered plate. The primary grain diameter can be measured by analysis of a cross-sectional SEM image of the sintered plate. For example, the sintered plate is processed with a cross-section polisher (CP) to expose a polished cross-section. The polished cross-section is observed by SEM (scanning electron microscopy) at a predetermined magnification (for example, 1000 folds) and a predetermined field of view (for example, 125 μm by 125 μm). In this case, the field of view is selected such that 20 or more primary grains are located in this field. In the resultant SEM image, circumscribed circles are drawn for all primary grains and the diameters of circumscribed circles are measured. From this measurement, the mean value of these diameters is defined as the primary grain diameter.

In the present specification, the term "porosity" refers to the volume rate of pores (including open pores and closed pores) in the LTO sintered plate. The porosity can be measured by analysis of a cross-sectional SEM image of the sintered plate. For example, the sintered plate is processed with a cross-section polisher (CP) to expose a polished cross-section. The polished cross-section is observed by SEM (scanning electron microscopy) at a predetermined magnification (for example, 1000 folds) and a predetermined field of view (for example, 125 µm by 125 µm). The resulting SEM image is analyzed to divide the total area of all pores in the field of view by the whole area (cross-sectional area) of the sintered plate in the field of view, and the resultant value is multiplied by 100 to give the porosity (%).

In the present specification, the term "open pore rate" refers to the volume rate (vol %) of open pores to all the pores (including open pores and closed pores) contained in the LTO sintered plate. The "open pores" refer to pores that are in communication with the outside of the sintered plate among all pores contained in the sintered plate. The "closed pores" refers to the pores that are not in communication with the outside of the sintered plate among all pores contained in the sintered plate. The open pore rate can be calculated from the total porosity corresponding to the sum of open and closed pores based on the bulk density, and the closed porosity corresponding to closed pores based on the apparent density. The parameters used for calculation of the open pore rate may be measured by, for example, the Archimedes method. For example, the closed porosity (vol %) can be determined from the apparent density measured by the Archimedes method, and the total porosity (vol %) can be determined from the bulk density measured by the Archimedes method. Accordingly, the open pore rate can be determined from the closed porosity and the total porosity by the following expression.

$$\begin{aligned}(\text{open pore rate}) &= (\text{open porosity})/(\text{total porosity})\\ &= (\text{open porosity})/[(\text{open porosity}) + (\text{closed porosity})]\\ &= [(\text{total porosity}) - (\text{closed porosity})]/(\text{total porosity})\end{aligned}$$

In the present specification, the term "mean pore aspect ratio" refers to the mean value of the aspect ratios of pores contained in the LTO sintered plate. The aspect ratio of the pore indicates the ratio of the longitudinal length to the lateral length of the pore. The mean pore aspect ratio can be measured by an image analysis of a cross-sectional SEM image of the sintered plate. For example, the sintered plate is processed with a cross-section polisher (CP) to expose a polished cross-section. The polished cross-section is observed by scanning electron microscopy (SEM) at a predetermined magnification (for example, 1000 folds) and a predetermined field of view (for example, 125 µm by 125 µm). The resultant SEM image is binarized with image analysis software to identify the pores. The aspect ratio is calculated by dividing the longitudinal length by the lateral length of each identified pore. The aspect ratios of all pores in the binary image are calculated to determine the mean aspect ratio. The term "The rate of pores having an aspect ratio of 1.30 or more to all pores" referred to in the present specification can also be determined in accordance with the procedure of image analysis as described above.

In the present specification, the term "mean pore diameter" refers to a volume-based D50 pore diameter in a pore diameter distribution (a cumulative distribution) measured for the LTO sintered plate. In this distribution, the abscissa represents a pore diameter and the ordinate represents cumulative volume % (relative to 100% of total pore volume). The volume-based D50 pore diameter has the same meaning as the volume-based D50 diameter widely known in the particle diameter distribution of powder. Accordingly, the volume-based D50 pore diameter indicates a pore diameter at which the cumulative pore volume reaches 50% of the total pore volume. The pore diameter distribution can be measured by a mercury intrusion method using a mercury porosimeter.

In the present specification, the term "volume-based D10 and D90 pore diameters" refers to volume-based D10 and D90 pore diameters in a pore diameter distribution (a cumulative distribution) measured for the LTO sintered plate. In this distribution, the abscissa represents a pore diameter and the ordinate represents cumulative volume % (relative to 100% of total pore volume). The volume-based D10 and D90 pore diameters have the same meaning as the volume-based D10 and D90 diameters widely known in the particle diameter distribution of powder. Accordingly, the volume-based D10 and D90 pore diameters indicate pore diameters at which the cumulative pore volume reaches 10% and 90% of the total pore volume, respectively. The pore diameter distribution can be measured by a mercury intrusion method using a mercury porosimeter.

LTO Sintered Plate

The LTO sintered plate according to the present invention is used in a negative electrode of a lithium secondary battery. The LTO sintered plate has a structure in which a plurality of primary grains are bonded. The LTO sintered plate has a thickness of 10 to 290 µm, a primary grain diameter, which is a mean grain diameter of the primary grains, of 1.2 µm or less, and a porosity of 21 to 45%. In addition, the LTO sintered plate has an open pore ratio of 60% or more, a mean pore aspect ratio of 1.15 or more, a rate of 30% or more of pores having an aspect ratio of 1.30 or more to all the pores, and a mean pore diameter of 0.70 µm or less, and the volume-based D10 and D90 pore diameters satisfy the relationship: $4.0 \leq D90/D10 \leq 50$. As described above, the LTO sintered plate that has a predetermined grain diameter and satisfies predetermined parameters on pores has high lithium ion conductivity and high electron conductivity, and can achieve satisfactory high-rate charge/discharge performance and superior high-temperature/low-temperature operation characteristics when incorporated as a negative electrode into a lithium secondary battery. The low-temperature operation characteristics are generally known in the LTO negative electrode. The high-temperature operation characteristics are based on the configuration of the LTO sintered plate that does not contain auxiliary components, such as a binder, that readily react with an electrolytic solution used in high-temperature environment.

In particular, the LTO sintered plate according to the present invention has a porosity of 21 to 45%, in other words, a compactness of 55 to 79%. Although LTO sintered plates with various densities are known (see, for example, PTLs 1 to 3), the LTO sintered plate according to the present invention has a certain porosity or compactness, and further has a certain range of diameter, shape, structure and distribution of the pores. The porosity or compactness may be studied mainly from the viewpoint of energy density and electron conductivity. For example, higher compactness (i.e., lower porosity) provided by sintering contributes to not only an improvement in electron conductivity but also an improvement in energy density. On the other hand, higher compactness (i.e., lower porosity) results in lower lithium ion conductivity. Such a decrease in ion conductivity is caused by insufficient penetration of the electrolytic solution into the sintered plate having reduced pores. In this mechanism, a trade-off relationship can be found between the electron conductivity and the lithium ion conductivity. In order to overcome this relationship, the control of the diameter, shape, structure and distribution of the pores according to the present invention can improve both the electron conductivity and the lithium ion conductivity, and thereby achieve satisfactory high-rate charge/discharge characteristics and superior high-temperature/low-temperature operation characteristics.

The LTO sintered plate has a structure in which a plurality of (i.e., a large number of) primary grains are bonded. The primary grains are composed of lithium titanate, $Li_4Ti_5O_{12}$ (LTO). It is known that the LTO typically has a spinel structure and may have any other structure during charge and discharge. For example, the reaction of the LTO proceeds in the copresence of $Li_4Ti_5O_{12}$ (spinel structure) and $Li_7Ti_5O_{12}$ (rock salt structure) during charge and discharge. Accordingly, the LTO may have any structure including a spinel structure.

The LTO sintered plate has a thickness of 10 to 290 μm, preferably 10 to 200 μm, more preferably 40 to 200 μm, further more preferably 40 to 175 μm, particularly preferably 50 to 160 μm. A thicker LTO sintered plate can achieve a battery having higher capacity and higher energy density. The thickness of the LTO sintered plate is determined, for example, by measuring the distance between the plate faces that are seen substantially in parallel in the case that the cross-section of the LTO sintered plate is observed with an SEM (scanning electron microscope).

The primary grain diameter, which is the mean grain diameter of primary grains constituting the LTO sintered plate, is 1.2 μm or less, preferably 0.02 to 1.2 μm, more preferably 0.05 to 0.7 μm. Such a diameter range can achieve both high lithium ion conductivity and high electron conductivity, resulting in an improvement in high-rate performance.

The LTO sintered plate contains pores. The sintered plate containing pores, particularly open pores, can promote penetration of an electrolytic solution into the inside of the sintered plate when incorporated as a negative electrode plate into a battery, and thereby improve lithium ion conductivity. The lithium ions in the sintered plate migrate based on two mechanisms: migration through the grains constituting the sintered plate and migration through the electrolytic solution in the pores. Since the migration through the electrolytic solution is greatly faster than that through the grains, an improvement in lithium ion conductivity can be achieved as described above.

The LTO sintered plate has a porosity of 21 to 45%, more preferably 22 to 40%, further more preferably 25 to 35%. Such a porosity range can achieve both high lithium ion conductivity and high electron conductivity, resulting in an improvement in high-rate performance.

The LTO sintered plate has an open pore rate of 60% or more, more preferably 65% or more, further more preferably 70% or more, particularly preferably 80% or more. The open pore rate may be 100%, typically 98% or less, more typically 95% or less, further more typically 90% or less. Since a higher open pore rate ensures sufficient penetration of an electrolytic solution into the sintered plate, lithium ion conductivity can be improved. Accordingly, such a range of open pore rate can achieve both high lithium ion conductivity and high electron conductivity, resulting in an improvement in high-rate performance.

The LTO sintered plate has a mean pore aspect ratio of 1.15 or more, preferably 1.15 to 3.50, more preferably 1.3 to 3.5. Since the pores inside the sintered plate have an anisotropic shape defined by an aspect ratio, an interface can be efficiently formed between the sintered plate and the electrolytic solution, resulting in an improvement in high-rate performance. For the same reason, the LTO sintered plate has a rate of preferably 30% or more, more preferably 30 to 90%, further more preferably 50 to 90% of the pores having an aspect ratio of 1.30 or more to all the pores.

The LTO sintered plate has a mean pore diameter of 0.70 μm or less, preferably 0.02 to 0.70 μm, more preferably 0.15 to 0.60 μm. Such a range of mean pore diameter can achieve both high lithium ion conductivity and high electron conductivity, resulting in an improvement in high-rate performance.

Volume-based D10 and D90 pore diameters in the LTO sintered plate satisfy $4.0 \leq D90/D10 \leq 50$, preferably $4.5 \leq D90/D10 \leq 50$, more preferably $5.0 \leq D90/D10 \leq 40$, particularly preferably $5.0 \leq D90/D10 \leq 20$. These relationships indicate that the pore diameter distribution is broad. For example, the relationship: $090/D10 \geq 4.0$ indicates that the D10 pore diameter significantly separates from the D90 pore diameter. Such a specific pore diameter distribution promotes the penetration of the electrolytic solution into the sintered plate, resulting in an improvement in high-rate performance.

The LTO sintered plate according to the present invention is used in a negative electrode of a lithium secondary battery. The preferred embodiment of the invention provides a lithium secondary battery comprising a positive electrode, a negative electrode containing the LTO sintered plate, and an electrolytic solution. The positive electrode preferably contains lithium complex oxides. Examples of lithium complex oxides include lithium cobaltate, lithium nickelate, lithium manganate, lithium nickelate-manganate, lithium nickelate-cobaltate, lithium cobaltate-nickelate-manganate, lithium cobaltate-manganate. The lithium complex oxides may contain one or more elements selected from, for example, Mg, Al, Si, Ca, Ti, V, Cr, Fe, Cu, Zn, Ga, Ge, Sr, Y, Zr, Nb, Mo, Ag, Sn, Sb, Te, Ba, Bi, W. The most preferred lithium complex oxide is lithium cobaltate ($LiCoO_2$). Accordingly, the positive electrode is composed of particularly preferably a sintered plate of lithium complex oxide, most preferably a sintered plate of lithium cobaltate. The electrolytic solution may be a known electrolytic solution generally used in lithium secondary batteries. In addition, an electrolytic solution may contain one or more selected from γ-butyrolactone, propylene carbonate, and ethylene carbonate in an amount of 96% by volume or more. Such an electrolytic solution can be used to operate the battery at high temperature, and stably manufacture a battery without deterioration of the battery in manufacturing at high temperature.

The lithium secondary battery produced with the LTO sintered plate in the present invention exhibits high reliability, such as high cycle performance and high storage performance (low self-discharge), resulting in arraying the batteries in series with simple control.

In addition, the lithium secondary battery with the LTO sintered plate in the present invention as a negative electrode does not generate dendrites; hence, the battery can be charged at a constant voltage (CV charge mode). The battery can be charged by any procedure including charge at a constant current (CC charge mod), at a constant current and constant voltage (CC-CV charge mod), and at a constant voltage (CV charge mode). In the case that the battery is charged only by the CV charge mode, the battery can be operated under simple control without use of a charging IC, and thereby has some advantages, such as thinning and down-sizing.

In the case that both the positive electrode and the negative electrode are made of ceramic, the separator may be also made of ceramic and these three parts may be integrated. For example, a ceramic positive electrode, a ceramic negative electrode, and a ceramic separator may be prepared, followed by bonding these parts to be integrated. Alternatively, before firing the ceramic parts, three green sheets providing the positive electrode, the negative electrode, and the separator, respectively, may be compressed into a laminate that may be then fired to yield an integrated ceramic member. Preferred examples of the materials constituting the ceramic separator include $Al_2O_3$, $ZrO_2$, MgO, SiC, and $Si_3N_4$.

A battery including the positive electrode and the negative electrode both made of ceramic plates can be thinned because both electrodes have high energy density. In particular, the thinned battery can be charged by the CV charge mode described above, resulting in suitable use for batteries in a smart card or IoT application.

Process

The LTO sintered plate of the present invention may be manufactured by any process, and is preferably manufactured through (a) preparation of an LTO-containing green sheet and (b) firing of the LTO-containing green sheet.

(a) Preparation of LTO-Containing Green Sheet

A raw material powder (LTO powder) composed of lithium titanate, $Li_4Ti_5O_{12}$, is provided. The raw material powder may be commercially available LTO powder, or may be synthesized before use. For example, the powder may be produced by hydrolysis of a mixture containing titanium tetraisopropoxy alcohol and lithium isopropoxide or firing of a mixture containing, for example, lithium carbonate and titania. The raw material powder has a volume-based D50 particle diameter of preferably 0.05 to 5.0 μm, more preferably 0.1 to 2.0 μm. A larger particle diameter of the raw material powder tends to form larger pores. If the raw material powder has large particle diameter, a pulverization process, for example, pot mill pulverization, bead mill pulverization, or jet mill pulverization may be employed so as to give a desired particle diameter. The raw material powder is then mixed with a dispersive medium and several additives (e.g., binder, plasticizer, and dispersant) to form a slurry. A lithium compound (e.g., lithium carbonate) in an excess of about 0.5 to 30 mol % other than $LiMO_2$ may be added to the slurry to promote grain growth or compensate for a volatile component during a firing process described later. The slurry preferably contains no pore-forming agent. The slurry is preferably defoamed by stirring under reduced pressure, and the viscosity is preferably adjusted into 4000 to 10000 cP. The resultant slurry is molded into a sheet to yield an LTO-containing green sheet. The green sheet is a molded substance in a form of independent sheet. An independent sheet (also referred to as a "self-supporting film") refers to a sheet (including strips having an aspect ratio of 5 or more) that can be independently handled in a singular form apart from other supports. In other words, the independent sheet is not fixed to a support (such as a substrate) and integrated with the support (so as to be inseparable or hard to separate). The sheet may be molded by various known processes, and preferably molded by a doctor blade process. The thickness of an LTO-containing green sheet may be appropriately selected so as to give the above desired thickness after firing.

(b) Firing of LTO-Containing Green Sheet

The LTO-containing green sheet is placed on a setter. The setter is made of ceramic, preferably made of zirconia or magnesia. The setter is preferably embossed. The green sheet placed on the setter is put in a sheath. The sheath is also made of ceramic, preferably made of alumina. In this configuration, an LTO sintered plate is produced by firing after optional degreasing. This firing may be performed preferably at 600 to 900° C. for 1 to 50 hours, more preferably at 700 to 800° C. for 3 to 20 hours. The resultant sintered plate is also an independent sheet. The heating rate during firing is preferably 100 to 1000° C./h, more preferably 100 to 600° C./h. In particular, this heating rate is employed preferably in a heating step of 300° C. to 800° C., more preferably in a heating step of 400° C. to 800° C.

(c) Summary

The LTO sintered plate in the present invention can be preferably produced as described above. In this preferred process, 1) adjustment of the particle diameter distribution of the LTO powder and/or 2) change of the heating rate during firing is effective, and contributes to the achievement of various properties of the lithium complex oxide sintered plate in the present invention. For example, although PTL 2 discloses that a lithium raw material and a titanium raw material are fired at 850° C., shaped into a sheet, and then fired without, for example, pulverization or disintegration. In contrast, the particle diameter distribution of the LTO raw material is desirably adjusted as described above in the process of manufacturing the LTO sintered plate in the present invention.

EXAMPLES

The present invention will be described in more detail by the following examples.

Example 1

(1) Production of Negative Electrode Plate
(1a) Preparation of LTO Green Sheet

LTO powder A (volume-based D50 particle diameter: 0.06 μm, manufactured by Sigma-Aldrich Japan LLC)(100 parts by weight), a dispersive medium (toluene:2-propanol=1:1)(100 parts by weight), a binder (poly(vinyl butyral): Product No. BM-2, manufactured by Sekisui Chemical Co., Ltd.)(20 parts by weight), a plasticizer (di-2-ethylhexyl phthalate (DOP), manufactured by Kurogane Kasei Co., Ltd.)(4 parts by weight), and a dispersant (product name: RHEODOL SP-030, manufactured by Kao Corporation)(2 parts by weight) were mixed. The resultant raw material mixture of the negative electrode was defoamed by stirring under reduced pressure to prepare an LTO slurry with a viscosity of 4000 cP. The viscosity was measured with an LVT viscometer manufactured by Brookfield. The slurry was shaped into an LTO green sheet on a PET film by a doctor blade process. The dried thickness of the LTO green sheet was selected so as to have a thickness of 10 μm after firing.

(1b) Firing of LTO Green Sheet

The resulting green sheet was cut into a 25 mm square with a cutter knife and placed on an embossed zirconia setter. The green sheet on the setter was put in an alumina sheath and kept at 500° C. for five hours, and then heated at a heating rate of 200° C./h and fired at 800° C. for five hours.

An Au film (thickness: 100 nm) as a current collecting layer was deposited by sputtering on the surface of the LTO sintered plate that was in contact with the setter, and then shaped by laser cutting into a square of 10 mm by 10 mm.

(2) Production of Positive Electrode Plate (2a) Preparation of LiCoO$_2$ Green Sheet Co$_3$O$_4$ raw material powder (manufactured by Seido Chemical Industry Co., Ltd.) (100 parts by weight), a dispersive medium (toluene:2-propanol=1:1) (100 parts by weight), a binder (poly(vinyl butyral): Product No. BM-2, manufactured by Sekisui Chemical Co., Ltd.) (10 parts by weight), a plasticizer (di-2-ethylhexyl phthalate (DOP), manufactured by Kurogane Kasei Co., Ltd.) (4 parts by weight), and a dispersant (product name: RHEODOL SP-030, manufactured by Kao Corporation) (2 parts by weight) were mixed. The mixture was defoamed by stirring under reduced pressure to prepare a slurry with a viscosity of 4000 cP. The viscosity was measured with an LVT viscometer manufactured by Brookfield. The slurry was molded into a green sheet onto a PET film by a doctor blade process. The dried thickness of the LiCoO$_2$ green sheet was selected so as to have a thickness of 7.5 μm after firing.

(2b) Preparation of Li$_2$CO$_3$ Green Sheet (Excess-Lithium Source)

Li$_2$CO$_3$ raw material powder (volume-based particle diameter D50:2.5 μm, manufactured by The Honjo Chemical Corporation) (100 parts by weight), a binder (poly(vinyl butyral): Product No. BM-2, manufactured by Sekisui Chemical Co., Ltd.) (5 parts by weight), a plasticizer (di-2-ethylhexyl phthalate (DOP), manufactured by Kurogane Kasei Co., Ltd.) (2 parts by weight), and a dispersant (RHEODOL SP-030, manufactured by Kao Corporation) (2 parts by weight) were mixed. The mixture was defoamed by stirring under reduced pressure to prepare a Li$_2$CO$_3$ slurry with a viscosity of 4000 cP. The viscosity was measured with an LVT viscometer manufactured by Brookfield. The Li$_2$CO$_3$ slurry was molded into a Li$_2$CO$_3$ green sheet on a PET film by a doctor blade process. The dried thickness of the Li$_2$CO$_3$ green sheet was selected such that the Li/Co molar ratio of the Li content in the Li$_2$CO$_3$ green sheet to the Co content in the LiCoO$_2$ green sheet had 1.05.

(2c) Preparation of LiCoO$_2$ Sintered Plate

The Co$_3$O$_4$ green sheet released from the PET film was cut into a 25 mm square with a cutter and placed on the center of a zirconia bottom setter (dimension: 90 mm square and 1 mm high). The green sheet on the setter was fired at 1100° C. for five hours and then kept at 750° C. for 20 hours to yield a Co$_3$O$_4$ sintered plate. The Li$_2$CO$_3$ green sheet as a lithium source was placed onto the Co$_3$O$_4$ sintered plate such that the Li/Co ratio (molar ratio) was 1.05, and a porous zirconia top setter was placed on the Li$_2$CO$_3$ green sheet. These green sheets disposed between the top and bottom setters were placed into an alumina sheath having a 120 mm square (manufactured by Nikkato Co., Ltd.). At this time, the alumina sheath was not tightly sealed, and was covered with a lid with a gap of 0.5 mm. The laminate was heated to 600° C. at a heating rate of 200° C./h, and was degreased for three hours. The laminate was then heated to 750° C. at 200° C./h, and was kept for 20 hours to fire. After the firing, the fired laminate was cooled to room temperature, and was removed from the alumina sheath. Thus, the LiCoO$_2$ sintered plate was yielded as a positive electrode plate. The positive electrode plate was shaped with a laser into a square of 9 mm by 9 mm.

(3) Manufacturing of Battery

The LiCoO$_2$ sintered plate (positive electrode plate), a separator, and the LTO sintered plate (negative electrode plate) were disposed in sequence to prepare a laminate. The laminate was immersed in an electrolytic solution to manufacture a laminate battery. The electrolytic solution was a solution of LiPF$_6$ (1 mol/L) in a mixed solvent of propylene carbonate (PC) and diethyl carbonate (DEC) in a volume ratio of 1:2. The separator was a 25 μm-thick single-layer membrane made of porous polypropylene (Celgard 2500™ manufactured by Celgard, LLC).

(4) Evaluation

The LTO sintered plate (negative electrode plate) synthesized in Procedure (1) and the battery produced in Procedure (2) were evaluated for various properties as shown below.

<Thickness>

The LTO sintered plate (negative electrode plate) was polished with a cross-section polisher (CP) (IB-15000CP, manufactured by JEOL Ltd.), and the cross-section of the negative electrode plate was observed with a SEM (JSM6390LA, manufactured by JEOL Ltd.) to determine the thickness of the negative electrode plate. In addition, the thickness of the dried LTO green sheet in Procedure (1a) was also determined in the same manner as described above.

<Primary Grain Diameter>

The LTO sintered plate was polished with a cross-section polisher (CP) (IB-15000CP, manufactured by JEOL Ltd.), and the cross-section of the negative electrode plate was observed with a SEM (JSM6390LA, manufactured by JEOL Ltd.) at a 1000-fold field of view (125 μm by 125 μm). At this time, a field of view containing 20 or more primary grains were selected. Circumscribed circles were drawn around all the primary grains in the resultant SEM image to measure the diameters of the circumscribed circles, and a mean value of the diameters was determined as a primary grain diameter.

<Porosity>

The LTO sintered plate was polished with a cross-section polisher (CP) (IB-15000CP, manufactured by JEOL Ltd.), and the cross-section of the negative electrode plate was observed with a SEM (JSM6390LA, manufactured by JEOL Ltd.) at a 1000-fold field of view (125 μm by 125 μm). The SEM image was subjected to an image analysis, the area of all the pores was divided by the area of the negative electrode, and the resultant value was multiplied by 100 to calculate the porosity (%).

<Open Pore Rate>

The open pore rate of the LTO sintered plate was determined by the Archimedes method.

In detail, the closed porosity was determined from the apparent density measured by the Archimedes method, and the total porosity was determined from the bulk density measured by the Archimedes method. The open pore rate was then determined from the closed porosity and the total porosity by the following expression:

$$\text{(open pore rate)} = \text{(open porosity)}/\text{(total porosity)}$$
$$= \text{(open porosity)}/[\text{(open porosity)} + \text{(closed porosity)}]$$
$$= [\text{(total porosity)} - \text{(closed porosity)}]/\text{(total porosity)}$$

<Mean Pore Aspect Ratio>

The LTO sintered plate was polished with a cross-section polisher (CP) (IB-15000CP, manufactured by JEOL Ltd.), and the cross-section of the positive electrode plate was observed with a SEM (JSM6390LA, manufactured by JEOL Ltd.) at a 1000-fold field of view (125 μm by 125 μm). The resultant SEM image was binarized using image analysis software ImageJ, and pores were identified from the binary image. For each pore identified in the binary image, the aspect ratio was calculated by dividing the longitudinal length by the lateral length. The aspect ratios for all pores in the binary image were calculated, and the mean value thereof was determined as a mean pore aspect ratio.

<Pore Diameter Distribution: D90/D10>

The volume-based pore diameter distribution of the LTO sintered plate was measured by a mercury intrusion method using a mercury porosimeter (Autopore IV 9510, manufactured by Shimadzu Corporation). In the pore diameter distribution curve with the abscissa representing a pore diameter and the ordinate representing cumulative volume %, pore diameters of volume-based D10 and D90 were detected to calculate a ratio of D90/D10.

<Mean Pore Diameter>

The volume-based pore diameter distribution of the LTO sintered plate was measured by a mercury intrusion method using a mercury porosimeter (Autopore IV 9510, manufactured by Shimadzu Corporation). In the pore diameter distribution curve with the abscissa representing a pore diameter and the ordinate representing cumulative volume %, the pore diameter of volume-based D50 was defined as a mean pore diameter.

<High-Rate Performance: 2 C/0.2 C>

The high-rate performance of the battery was measured at 25° C. in the potential range of 2.7 V to 1.5 V in accordance with the following procedures:

(i) The battery was charged at constant current of 0.2 C until the battery voltage reached 2.7 V, charged at constant voltage until the current value reached 0.02 C, and then discharged at 0.2 C until the battery voltage reached 1.5V. The charge/discharge cycles were repeated three times in total, and the discharge capacity of the battery was measured for each cycle. The mean value of these capacities is determined as 0.2 C discharge capacity.

(ii) The battery was charged at constant current of 2 C until the battery voltage reached 2.7 V, charged at constant voltage until the current value reached 0.2 C, and then discharged at 0.2 C until the battery voltage reached 1.5V. The charge/discharge cycles were repeated three times in total, and the discharge capacity of the battery was measured for each cycle. The mean value of these capacities is determined as 2 C discharge capacity.

(iii) The high-rate performance (%) was determined by dividing the 2 C discharge capacity by the 0.2 C discharge capacity and multiplying by 100.

Example 2

A negative electrode plate and a positive electrode plate were produced, and a battery was manufactured and evaluated as in Example 1 except that the negative electrode plate had a thickness of 200 μm and the positive electrode plate had a thickness of 150 μm.

Example 3

A negative electrode plate and a positive electrode plate were produced, and a battery was manufactured and evaluated as in Example 1 except that the negative electrode plate had a thickness of 100 μm and the positive electrode plate had a thickness of 75 μm. In addition, the battery evaluated as in Example 1 or 2 except that the battery was kept at 85° C. exhibited a high-rate performance (2 C/0.2 C) of 97%.

Example 4

A negative electrode plate and a positive electrode plate were produced, and a battery was manufactured and evaluated as in Example 3 except that LTO powder B was used in place of the LTO powder A. The LTO powder B was prepared by mixing of titanium tetraisopropoxy alcohol (manufactured by Wako Pure Chemical Industries, Ltd.) and lithium isopropoxide (manufactured by Kojundo Chemical Laboratory Co., Ltd.) at a molar ratio of 1:1 and hydrolysis of the mixture.

Example 5

A negative electrode plate and a positive electrode plate were produced, and a battery was manufactured and evaluated as in Example 4 except that LTO powder C was used in place of the LTO powder B. The LTO powder C was prepared by heat-treatment of the LTO powder B at 800° C. for ten hours and disintegration of the heat-treated powder in a pot mill for three hours.

Example 6

A negative electrode plate and a positive electrode plate were produced, and a battery was manufactured and evaluated as in Example 3 except that the LTO green sheet was fired at 850° C. for three hours.

Example 7

A negative electrode plate and a positive electrode plate were produced, and a battery was manufactured and evaluated as in Example 3 except that the LTO green sheet was fired at 750° C. for ten hours.

Example 8

A negative electrode plate and a positive electrode plate were produced, and a battery was manufactured and evaluated as in Example 3 except that a particulate phenolic resin (Bellpearl R100, manufactured by Air Water Inc.) was further added during the preparation of the negative electrode raw material mixture in an amount of 3 wt % with respect to the total amount of the mixture.

Example 9

A negative electrode plate and a positive electrode plate were produced, and a battery was manufactured and evaluated as in Example 3 except that the LTO green sheet was further kept at 600° C. for ten hours during the firing.

Example 10

A negative electrode plate and a positive electrode plate were produced, and a battery was manufactured and evaluated as in Example 3 except that LTO powder D was used in place of the LTO powder A. The LTO powder D was prepared by spray-drying of the LTO powder A and had a volume-based D50 diameter of 10 μm.

Example 11

A negative electrode plate and a positive electrode plate were produced, and a battery was manufactured and evaluated as in Example 3 except that LTO powder E was used in place of the LTO powder A. The LTO powder E was prepared by pulverization of the LTO powder A in a pot mill for 20 hours.

Example 12

A negative electrode plate and a positive electrode plate were produced, and a battery was manufactured and evaluated as in Example 3 except that the heating rate during the firing of the LTO green sheet was 100° C./h from room temperature to 400° C. and 150° C./h from 400° C. to 800° C.

Example 13

A negative electrode plate and a positive electrode plate were produced, and a battery was manufactured and evaluated as in Example 3 except that the LTO green sheet was fired at 850° C. for ten minutes in an atmosphere having an oxygen concentration of 70% and then at 800° C. for five hours.

Example 14

A negative electrode plate and a positive electrode plate were produced, and a battery was manufactured and evaluated as in Example 3 except that 1) the LTO green sheet was roll-pressed before the firing, and 2) the $Li_2CO_3$ sheet was placed on the LTO green sheet during the firing such that the $Li_2CO_3$ sheet had a Li content of 5 mol % to that of the LTO green sheet.

Example 15

A negative electrode plate and a positive electrode plate were produced, and a battery was manufactured and evaluated as in Example 3 except that LTO powder F was used in place of the LTO powder A. The LTO powder F was prepared by heat-treatment of powder having a D50 of 10 μm yielded through spray-drying of the LTO powder A at 600° C.

Example 16

A negative electrode plate and a positive electrode plate were produced, and a battery was manufactured and evaluated as in Example 3 except that LTO powder G was used in place of the LTO powder A. The LTO powder G was prepared by classification of the LTO powder A at a classification point of 1 μm, and had a particle diameter of 1 μm or less.

Example 17

A negative electrode plate and a positive electrode plate were produced, and a battery was manufactured and evaluated as in Examples 3 to 5 except that LTO powder H was used in place of the LTO powder A. The LTO powder H was prepared by mixing of the LTO powders A, B and C in equal weight.

Example 18 (Comparative)

A negative electrode plate and a positive electrode plate were produced, and a battery was manufactured and evaluated as in Example 1 except that the negative electrode plate had a thickness of 300 μm and the positive electrode plate had a thickness of 225 μm.

Example 19 (Comparative)

A negative electrode plate and a positive electrode plate were produced, and a battery was manufactured and evaluated as in Example 4 except that LTO powder I was used in place of the LTO powder B. The LTO powder I was prepared by heat-treatment of the LTO powder B at 900° C. for ten hours and disintegration of the heat-treated powder in a pot mill for three hours.

Example 20 (Comparative)

A negative electrode plate and a positive electrode plate were produced, and a battery was manufactured and evaluated as in Example 3 except that the LTO green sheet was fired at 900° C. for two hours.

Example 21 (Comparative)

A negative electrode plate and a positive electrode plate were produced, and a battery was manufactured and evaluated as in Example 3 except that the LTO green sheet was kept at 700° C. for 15 hours during the firing.

Example 22 (Comparative)

A negative electrode plate and a positive electrode plate were produced, and a battery was manufactured and evaluated as in Example 4 except that LTO powder J was used in place of the LTO powder B. The LTO powder J was prepared by spray-drying of the LTO powder B and had a volume-based D50 diameter of 5 μm.

Example 23 (Comparative)

A negative electrode plate and a positive electrode plate were produced, and a battery was manufactured and evaluated as in Examples 3 and 5 except that LTO powder K was used in place of the LTO powder A. The LTO powder K was prepared by mixing of the LTO powders A and C in equal weight.

Example 24 (Comparative)

A negative electrode plate and a positive electrode plate were produced, and a battery was manufactured and evaluated as in Example 3 except that LTO powder L was used in place of the LTO powder A. The LTO powder L was prepared by spray-drying of the LTO powder A and had a volume-based D50 diameter of 20 μm.

Example 25 (Comparative)

A negative electrode plate and a positive electrode plate were produced, and a battery was manufactured and evaluated as in Example 3 except that LTO powder M was used in place of the LTO powder A. The LTO powder M was prepared by classification of the LTO powder A at a classification point of 0.65 μm, and had a particle diameter of 0.65 μm or less.

Example 26

A battery was manufactured as in Example 3 except that the electrolytic solution was a solution of $LiBF_4$ (1.5 mol/L) in a mixed solvent of ethylene carbonate (EC) and γ-butyrolactone (GBL) in a volume ratio of 1:3. The battery was evaluated as described above except that the battery was kept at 110° C., and exhibited a high-rate performance (2 C/0.2 C) of 99%.

Example 27

A negative electrode plate and a positive electrode plate were produced, and a battery was manufactured and evaluated as in Example 1 except that 1) the negative electrode plate had a thickness of 290 μm, 2) the LTO green sheet was fired by heating up from 700° C. to 770° C. in five hours, and 3) the positive electrode plate had a thickness of 265 μm.

Results

The results of evaluation in Examples 1 to 25 and 27 are shown in Table 1.

TABLE 1

| | | | Negative electrode plate | | | | | | |
|---|---|---|---|---|---|---|---|---|---|
| | Material | Thickness (μm) | Primary grain diameter (μm) | Porosity (%) | Open pore rate (%) | Mean pore aspect ratio | Ratio of pores having aspect ratio of 1.30 or more to all pores (%) | Mean pore diameter (μm) | Pore diameter distribution (D90/D10) | High-rate performance (2 C./0.2 C.) |
| Ex. 1 | CP | 10 | 0.2 | 30 | 80 | 1.3 | 50 | 0.15 | 10 | 95 |
| Ex. 2 | CP | 200 | 0.2 | 30 | 80 | 1.3 | 50 | 0.15 | 10 | 70 |
| Ex. 3 | CP | 100 | 0.2 | 30 | 80 | 1.3 | 50 | 0.15 | 10 | 85 |
| Ex. 4 | CP | 100 | 0.02 | 30 | 80 | 1.3 | 50 | 0.15 | 10 | 88 |
| Ex. 5 | CP | 100 | 1.2 | 30 | 80 | 1.3 | 50 | 0.15 | 10 | 78 |
| Ex. 6 | CP | 100 | 0.2 | 21 | 70 | 1.3 | 50 | 0.15 | 10 | 70 |
| Ex. 7 | CP | 100 | 0.2 | 45 | 80 | 1.3 | 50 | 0.15 | 10 | 95 |
| Ex. 8 | CP | 100 | 0.2 | 30 | 90 | 1.3 | 50 | 0.15 | 10 | 90 |
| Ex. 9 | CP | 100 | 0.2 | 30 | 65 | 1.3 | 50 | 0.15 | 10 | 70 |
| Ex. 10 | CP | 100 | 0.2 | 30 | 80 | 1.15 | 50 | 0.15 | 10 | 80 |
| Ex. 11 | CP | 100 | 0.2 | 30 | 80 | 3.5 | 50 | 0.15 | 10 | 82 |
| Ex. 12 | CP | 100 | 0.2 | 30 | 80 | 1.3 | 30 | 0.15 | 10 | 80 |
| Ex. 13 | CP | 100 | 0.2 | 30 | 80 | 1.3 | 90 | 0.15 | 10 | 88 |
| Ex. 14 | CP | 100 | 0.2 | 30 | 80 | 1.3 | 50 | 0.02 | 10 | 78 |
| Ex. 15 | CP | 100 | 0.2 | 30 | 80 | 1.3 | 50 | 0.7 | 10 | 76 |
| Ex. 16 | CP | 100 | 0.2 | 30 | 80 | 1.3 | 50 | 0.15 | 4.5 | 78 |
| Ex. 17 | CP | 100 | 0.2 | 30 | 80 | 1.3 | 50 | 0.15 | 50 | 88 |
| Ex. 18* | CP | 300 | 0.2 | 30 | 80 | 1.3 | 50 | 0.15 | 10 | 30 |
| Ex. 19* | CP | 100 | 1.5 | 30 | 80 | 1.3 | 50 | 0.15 | 10 | 45 |
| Ex. 20* | CP | 100 | 0.2 | 18 | 65 | 1.3 | 50 | 0.15 | 10 | 40 |
| Ex. 21* | CP | 100 | 0.2 | 30 | 55 | 1.3 | 50 | 0.15 | 10 | 30 |
| Ex. 22* | CP | 100 | 0.2 | 30 | 80 | 1.1 | 50 | 0.15 | 10 | 55 |
| Ex. 23* | CP | 100 | 0.2 | 30 | 80 | 1.3 | 20 | 0.15 | 10 | 50 |
| Ex. 24* | CP | 100 | 0.2 | 30 | 80 | 1.3 | 50 | 1 | 10 | 45 |
| Ex. 25* | CP | 100 | 0.2 | 30 | 80 | 1.3 | 50 | 0.15 | 3.5 | 58 |
| Ex. 27 | CP | 290 | 0.2 | 43 | 88 | 1.3 | 50 | 0.15 | 10 | 68 |

*Comparative Example
CP: Ceramic Plate

What is claimed is:

1. A lithium titanate sintered plate for use in a negative electrode of a lithium secondary battery, wherein the lithium titanate sintered plate has a structure in which a plurality of primary grains are bonded, and has:

a thickness of 10 to 290 μm;

a primary grain diameter of 1.2 μm or less, the primary grain diameter being a mean grain diameter of the primary grains;

a porosity of 21 to 45%;

an open pore rate of 60% or more;

a mean pore aspect ratio of 1.15 or more;

a ratio of 30% or more of pores having an aspect ratio of 1.30 or more to all the pores; and a mean pore diameter of 0.70 μm or less, wherein volume-based D10 and D90 pore diameters satisfy the relationship: $4.0 \leq D90/D10 \leq 50$.

2. The lithium titanate sintered plate according to claim 1, wherein the lithium titanate sintered plate has:

a primary grain diameter of 0.02 to 1.2 μm, the primary grain diameter being a mean grain diameter of the primary grains;

an open pore rate of 65 to 90%;

a mean pore aspect ratio of 1.15 to 3.50;

a ratio of 30 to 90% of pores having an aspect ratio of 1.30 or more to all the pores; and a mean pore diameter of 0.02 to 0.70 μm, wherein volume-based D10 and D90 pore diameters satisfy the relationship: $4.5 \leq D90/D10 \leq 50$.

3. The lithium titanate sintered plate according to claim 2, wherein the lithium titanate sintered plate has a thickness of 40 to 200 μm.

4. The lithium titanate sintered plate according to claim 1, wherein the lithium titanate sintered plate has a thickness of 40 to 200 μm.

5. A lithium secondary battery comprising a positive electrode, a negative electrode containing the lithium titanate sintered plate according to claim 1, and an electrolytic solution.

* * * * *